US008401888B2

(12) United States Patent
Dance et al.

(10) Patent No.: US 8,401,888 B2
(45) Date of Patent: Mar. 19, 2013

(54) METHODS FOR SUPPLY CHAIN MANAGEMENT

(75) Inventors: Christopher R. Dance, Grenoble (FR); Onno Zoeter, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1 day.

(21) Appl. No.: 13/096,308

(22) Filed: Apr. 28, 2011

(65) Prior Publication Data

US 2011/0202434 A1 Aug. 18, 2011

Related U.S. Application Data

(62) Division of application No. 12/570,430, filed on Sep. 30, 2009, now Pat. No. 7,958,004.

(51) Int. Cl.
*G06Q 10/00* (2006.01)

(52) U.S. Cl. ..................................... 705/7.29

(58) Field of Classification Search .............. 705/7.11, 705/7.29
See application file for complete search history.

(56) References Cited

U.S. PATENT DOCUMENTS

| | | | | |
|---|---|---|---|---|
| 5,953,707 A | * | 9/1999 | Huang et al. | 705/7.25 |
| 7,607,577 B1 | * | 10/2009 | Yu et al. | 235/383 |
| 2002/0143665 A1 | * | 10/2002 | Santos et al. | 705/28 |

OTHER PUBLICATIONS

Wagner (An Empirical Study of Exactly and Approximately Optimal Inventory Policies). May 1965, Management Science, vol. 11 No. 7, pp. 690-723.*

Boyaci et al Minimizing holding and ordering costs subject to a bound on backor as easy as solving a single backorder cost model, Nov. 2001, Operations Research Letters, pp. 1-9.*
Levi, Retsef, Martin Pal, Robin O. Roundy and David B. Shmoys. "Approximation Algorithms for Stochastic Inventory Control Models." Mathematics of Operations Research, vol. 32, No. 2, May 2007, pp. 284-302.
Sindhuchao, Sombat, H. Edwin Romeijn, Elif Akcali and Rein Boondiskulchok, "An Integrated Inventory-Routing System for Multi-item Joint Replenishment with Limited Vehicle Capacity." Journal of Global Optimization, 2005, 32, pp. 93-118.
Ohno, K. and T. Ishigaki. "A multi-item continuous review inventory system with compound Poisson demands." Mathematical Methods of Operations Research, 2001, 53, pp. 147-165.
Schultz, Helle and Soren Glud Johansen. "Can-order policies for coordinated inventory replenishment with Erlang distributed times between ordering." European Journal of Operational Research, 113, 1999, pp. 30-41.
Feng, Haolin, Kumar Muthuraman and Vinayak Deshpande. "Replenishment Policies for Multi-Product Stochastic Inventory Systems with Correlated Demand and Joint-Replenishment Costs." Multi-Product Stochastic Inventory Systems, Oct. 1, 2008, pp. 1-23.

(Continued)

*Primary Examiner* — Romain Jeanty
(74) *Attorney, Agent, or Firm* — MH2 Technology Law Group LLP

(57) ABSTRACT

According to various embodiments, the present teachings include inventory control policies that are defined in terms of functions of aggregate cost rates, involving thresholds $\Omega$ and an order-up-to point S. An embodiment of the present teachings includes a method. The method includes tracking an inventory position of each of the plurality of items by a logistics network and determining an item cost rate for each of the plurality of items based on the tracked inventory position. The method also includes determining an aggregate cost rate for the plurality of items based on the determined item cost rates, comparing the aggregate cost rate with a cost rate threshold $\Omega$, and ordering the plurality of items to an order-up-to point S if the compared aggregate cost rate is greater than or equal to the cost rate threshold $\Omega$.

3 Claims, 5 Drawing Sheets

OTHER PUBLICATIONS

Viswanatham, S. "Note. Periodic Review (s, S) Polices for Joint Replenishment Inventory Systems." Management Science, vol. 43, No. 10, Oct. 1997, pp. 1447-1454.

Larsen, Christian. "Comments to Ozkaya et al. (2006)." PhD Thesis. Department of Business Studies, Aarhus School of Business, Denmark, pp. 1-13.

Gurbuz, Mustafa Cagri, Kamran Moinzadech and Yong-Pin Zhou. "Coordinated Replenishment and Shipping Strategies in Inventory/Distribution Systems." PhD Thesis. Department of Business Studies, University of Washington Business School, Jan. 2005, pp. 1-32.

Ozkaya, Banu Yuksel, Ulku Gurler and emre Berk. "The Stochastic Joint Replenishment Problem: A New Policy, Analysis, and Insights." Naval Research Logistics, vol. 53, Apr. 25, 2006, pp. 525-546.

Thonemann, Ulrich W., Alex O. Brown and Warren H. Hausman. "Easy Quantification of Improved Spare Parts Inventory Policies." Management Science, vol. 48, No. 9, Sep. 2002, pp. 1213-1225.

Kalin, Dieter. "On the Optimality of (o, S) Policies." Mathematics of Opearations Research, vol. 5, No. 2, May 1980, pp. 293-307.

Nielsen, Christina and Christian Larsen. "An analytical study of the Q (s, S) policy applied to the joint replenishment problem." European Journal of Operational Research, 163, 2005, pp. 721-732.

Hurley, Gavin, Peter Jackson, Retsef Levi, Robin O. Roundy and David B. Shmoys. "New Policies for Stochastic Inventory Control Models: Theoretical and Computational Results." Operations Research, Feb. 27, 2008, pp. 1-34.

Gallego, Guillermo and Suresh P. Sethi. "K-Convexity in Rn." Department of Industrial Engineering and Operations Research, The Columbia University, Sep. 16, 2004, pp. 1-21.

Levi, Retsef, Robin O. Roundy and David B. Shmoys. "Provably Near-Optimal Sampling-Based Algorithms for Stochastic Inventory Control Models." STOC' 06, May 21-23, 2006.

Johansen, S.G. and P. Melchiors. "Can-order policy for the periodic-review joint replenishment problem." Journal of the Operational Research Society, 2003, 54, pp. 283-290.

Federgruen, Awi and Zvi Schechner. "Cost Formulas for Continuous Review Inventory Models with Fixed Delivery Lags." Operations Research, Sep.-Oct. 1983, vol. 31, No. 5, pp. 957-965.

Johansen, Soren Glud and Anders Thorstenson. "Value-based Q(s, S) policy for joint replenishments." Department of Operations Research, University of Aarhus, Sep. 6, 2006, pp. 1-18.

Adelman, Daniel and Diego Klabjan. "Duality and Existence of Optimal Policies in Generalized Joint Replenishment." Mathematics of Operations Research, vol. 30, No. 1, Feb. 2005, pp. 28-50.

Frenk, J.B.G., M.J. Kleijn and R. Dekker. "An efficient algorithm for a generalized joint replenishment problem." Feb. 14, 1997, pp. 1-23.

Zheng, Yu-Sheng and A. Federgruen. "Finding Optimal (s, S) Policies is About as Simple as Evaluating a Single Policy." Operations Research, vol. 39, No. 4, Jul.-Aug. 1991, pp. 654-665.

Larsen, Christian. "The Q(s, S) control policy for the joint replenishment problem extended to the case of correlation among item-demands." International Journal of Production Economics, vol. 118(1), Mar. 2009, pp. 292-297.

Viswanathan, S. "An Algorithm for Determining the Best Lower Bound for the Stochastic Joint Replenishment Problem." Operations Research, vol. 55, No. 5, Sep.-Oct. 2007, pp. 992-996.

Nilsson, Andreas. "Essays on Joint Replenishment and Multi-Echelon Inventory System." 2006:I6, pp. 1-93.

Scarf, Herbert. "The Optimality of (S, s) Policies in the Dynamic Inventory Problem." Policies in Dynamic Inventory Problem, 1960, pp. 196-202.

Arkin, Esther, Dev Joneja and Robin Roundy. "Computational Complexity of Uncapacitated Multi-Echelon Production Planning Problems." Technical Report No. 816, School of Operations Research, Cornell University, Aug. 1988, pp. 1-14.

Naseraldin, Hussein and Yale T. Herer. "Integrating the Number and Location of Retail Outlets on a Line with Replenishment Decisions." Management Science, vol. 54, No. 9, Sep. 2008, pp. 1666-1683.

Daskin, Mark S., Collette R. Coullard and Zuo-Jun Max Shen. "An Inventory-Location Model: Formulation, Solution Algorithm and Computational Results." Annals of Operations Research, 110, 2002, pp. 83-106.

Snyder, Lawrence V., Mark S. Daskin and Chung-Piaw Teo. "The stochastic location model with risk pooling." European Journal of Operational Research, 179, 2007, pp. 1221-1238.

Roundy, Robin. "Rounding Off to Powers of Two in Continuous Relaxations of Capacitated Lot Sizing Problems." Technical Report No. 716, School of Operations Research, Cornell Univeristy, Aug. 1986, pp. 1-24.

Vondrak, Jan. "Probabilistic Methods in Combinatorial and Stochastic Optimization," PhD Thesis. Department of Mathematics, Massachusetts Institute of Technology, Feb. 2005, pp. 1-106.

Shen, Zuo-Jun Max, Collette Coullard and Mark S. Daskin. "A Joint Location-Inventory Model." Transportation Science, vol. 37, No. 1, Feb. 2003, pp. 40-55.

Miranda et al., "Incorporating inventory control decisions into a strategic distribution network design model with stochastic demand", May 2004, Transportation Research Part E: Logistics and Transportation Review, vol. 40, Issue 3, pp. 183-207.

Rosling, Inventory Cost Rate Functions with Nonlinear Shortage Costs, Dec. 2002, Operations Research, vol. 50, No. 6, pp. 1007-1017.

Benjaafar et al., "Production-Inventory Systems with Imperfect Advance Demand Information and Updating", Aug. 2006, Department of Mechanical Engineering, University of Minnesota, pp. 1-57.

Federgruen et al., "Combined pricing and inventory control under uncertainty", Jun. 1999, Operations Research, vol. 47, No. 3 pp. 453-475.

Teunter, "On the non-optimality of the average cost approach for inventory models with remanufacturing", Sep. 2002, International Journal of Productions Economics, vol. 79, pp. 67-73.

Tanrikulu, Mehmet Mustafa, "Joint Replenishment Problem with Truck Cost Structures," A Thesis Submitted to the Department of Industrial Engineering and the Institute of Engineering and Science of Bilkent University, Dec. 2006, pp. 1-81.

* cited by examiner

METHODS FOR SUPPLY CHAIN MANAGEMENT

CROSS REFERENCE TO RELATED APPLICATION

This application is a divisional application of U.S. patent application Ser. No. 12/570,430 filed on Sep. 30, 2009, the disclosure of which is incorporated herein by reference in its entirety.

FIELD OF THE INVENTION

Present embodiments are directed to inventory control policies for the stochastic joint replenishment problem (SJRP), specifically policies that cost no more than three times the cost of an optimal policy.

BACKGROUND OF THE INVENTION

There are many ways to attempt to minimize costs involved with inventory replenishment. The inventory can contain any number and type of products or items, e.g., clothes, spare parts, grades of oil, office supplies, etc. When attempting to determine an appropriate inventory policy various cost components can be considered, for example, ordering costs, holding costs, backlog costs, etc. Also, when determining an inventory control policy various assumptions can be used, for example, that demand for inventory items is independent, or that there will be one-for-one item replenishment upon ordering.

One specific type of inventory replenishment problem is referred to as the stochastic joint replenishment problem (SJRP). The SJRP is directed to determining a method of ordering some set of items that are subject to random (stochastic) demands in such a way as to minimize the joint costs of ordering, holding inventory, and backlogging demand. The term "joint" is used herein to indicate that costs are coupled and economies of scale arise when multiple items are simultaneously ordered.

While various heuristic policies have been proposed for the SJRP (e.g., can-order, periodic review, Q(s,S)), these policies can be arbitrarily sub-optimal. Methods for determining optimal policies such as policy and value iteration can become impractical when more than 7 items are considered, in part due to the need for excessive computational power. There has been significant research to determine heuristic policies that guarantee a close-to-optimal policy in closely related problems such as power-of-two policies for deterministic joint replenishment and cost balancing policies for single-item and multi-echelon replenishment. However it is not obvious to extend these heuristics to the SJRP. Thus, there is a need to overcome these and other problems with the prior art and to provide an inventory policy that can more optimally minimize costs for the SJRP.

SUMMARY OF THE INVENTION

According to various embodiments, the present teachings include inventory control policies that are defined in terms of functions of aggregate cost rates, involving thresholds $\Omega$ and an order-up-to point S. An embodiment of the present teachings includes a method for controlling an inventory including a plurality of items. The method includes tracking an inventory position of each of the plurality of items by a logistics network and determining an item cost rate for each of the plurality of items based on the tracked inventory position. The method also includes determining an aggregate cost rate for the plurality of items based on the determined item cost rates, comparing the aggregate cost rate with a cost rate threshold $\Omega$, and ordering the plurality of items to an order-up-to point S if the compared aggregate cost rate is greater than or equal to the cost rate threshold.

Another embodiment according to the present teachings includes a method, comprising providing operating cost parameters and an order-up-to point S for a plurality of items. The method also samples a plurality of demand scenarios for the plurality of items, each demand scenario comprising at least one random demand for at least one of the plurality of items over a predetermined time period at a processor. Aggregate costs and aggregate times are determined for at least one combination of at least one sampled demand scenario, at least one cost rate threshold, and the order-up-to point S. Average operating cost rates are determined based on the determined aggregate costs and determined aggregate times and a single cost rate threshold $\Omega$ is selected for the inventory system based on the determined average operating cost rates. The selected single cost rate threshold can be selected to achieve a minimal value or a reasonably low value for the average operating cost rate of the inventory system. The method also includes ordering items to meet S when an aggregate cost rate is equal to or exceeds the selected cost rate threshold $\Omega$.

Embodiments further include, computer readable mediums encoded with a method, the method comprising providing operating cost parameters and an order-up-to point S for a plurality of items. The method also samples a plurality of demand scenarios for the plurality of items, each demand scenario comprising at least one random demand for at least one of the plurality of items over a predetermined time period at a processor. Aggregate costs and aggregate times are determined for at least one combination of at least one sampled demand scenario, at least one cost rate threshold, and the order-up-to point S. Average operating cost rates are determined based on the determined aggregate costs and determined aggregate times and a single cost rate threshold $\Omega$ is selected for the inventory system based on the determined average operating cost rates. The selected single cost rate threshold can be selected to achieve a minimal value or a reasonably low value for the average operating cost rate of the inventory system. The method also includes ordering items to meet S when an aggregate cost rate is equal to or exceeds the selected cost rate threshold $\Omega$.

In additional embodiments, the item costs are non-negative, convex, and coercive functions of the item inventory position. Other embodiments further include tracking aggregate costs for the sampled demand scenarios as a function of the number of each item demanded to the end of the predetermined time period and the order-up-to point S and determining cumulative maximum aggregate cost rates for the sampled demand scenarios as a function of tracked inventory positions. The aggregate cost rates can be a function of penalty cost rates. In another embodiment, the method is at most a 3-approximation of an optimal method. Further embodiments can include tracking the aggregate costs, aggregate times and aggregate cost rates using recursion.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

It should be noted that some details of the figures have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Present embodiments present new methods to solve the stochastic joint replenishment problem (SJRP). The SJRP relates to determining the optimal ordering policy for an inventory consisting of a set of items where the costs and cost rates, for example, a setup cost per order, a holding cost rate, a fixed penalty cost and a proportional penalty cost rate, depend on the level (or amount) of each item type in the inventory, where demand is stochastic. Present teachings include a description of a new set of heuristics which are close to an optimal solution to the SJRP and indeed, remain within finite bounds of an optimal solution.

As used herein, the term policy refers to a function which maps the state of a system to ordering decisions and the term inventory includes any products that can be stored, ordered, demanded, etc. Product as used herein can include abstract items, e.g., goodwill, ordering, research projects, etc., as well as tangible items, e.g., clothes, stock, spare parts, office supplies, etc. When using abstract products, for example, an inventory of "research projects," holding costs can correspond to maintaining knowledge to exploit the results of the projects, penalty costs can correspond to failing to be able to demonstrate new results in a particular domain and there can be economies of scale in ordering due to synergies between research themes. Also, as used herein, policy, inventory policy, replenishment policy, etc. are interchangeable and refer to a function which maps the state of a system to ordering decisions.

Figure 1:
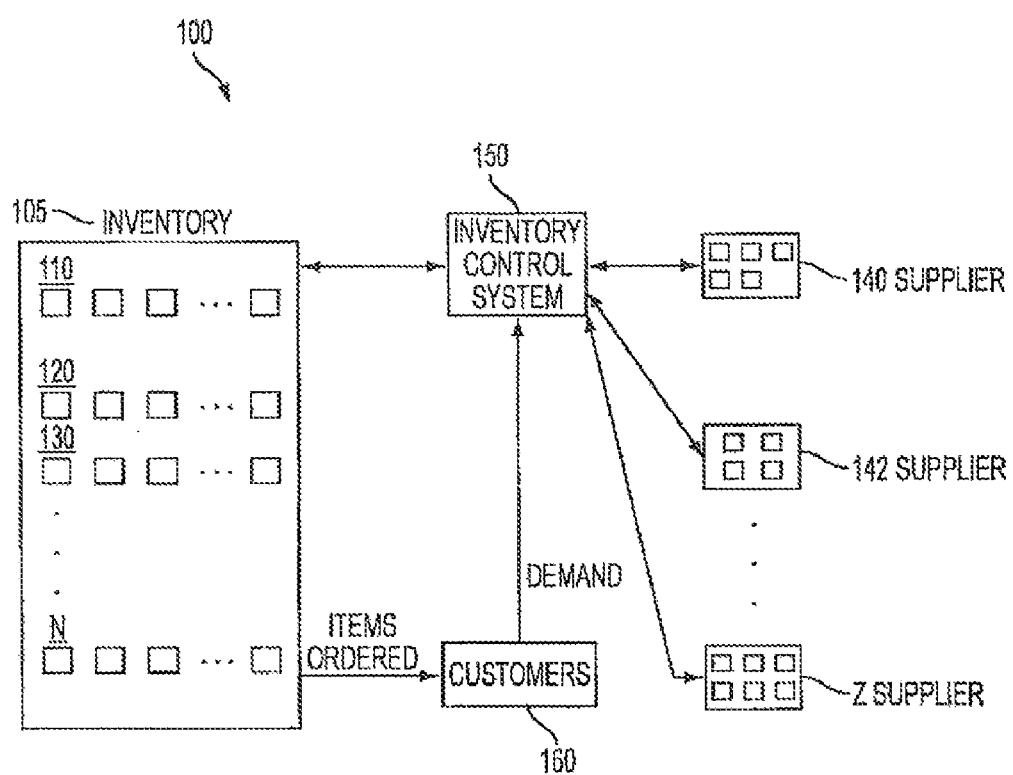
FIG. 1 is an example embodiment of an inventory system to which the presently taught inventory policies can be applied.

FIG. 1 shows an example inventory system 100, which can use the inventory policies discussed below. Inventory system 100 can include a physical inventory 105 of a plurality of items 110, 120, 130, ..., N, where there can be one or more of each item 110, 120, 130, ..., N. Inventory system 100 also can include an inventory control system 150, which uses inventory policies according to the present teachings to track when to order more of at least one of items 110, 120, 130, ..., N. Inventory control system 150 can order replenishment inventory from at least one of suppliers 140, 142, ..., Z. Each supplier 140, 142, ..., Z can supply a single item (e.g., 110 or 120) or a combination of items (e.g., 110 and 120 and 130). The inventory system 100 can also include customers 160. As shown by the arrows in FIG. 1, customers 160 order a set of items, also referred to as a demand for the set of items. This demand can be forwarded to inventory control system 150, which then can check the physical inventory 105 to see whether the set of demanded items is present or some combination of the set of demanded items needs to be ordered to replenish physical inventory 105 and customer demand. If physical inventory 105 has the demanded set of items or some combination thereof, then the available demanded items can be supplied to the customers 160 as shown. However, if physical inventory 105 does not include all or a portion of the demanded set of items or the demand will deplete physical inventory 105, then inventory control system 150 can order replenishments from suppliers 140, 142, ..., Z.

Figure 2:
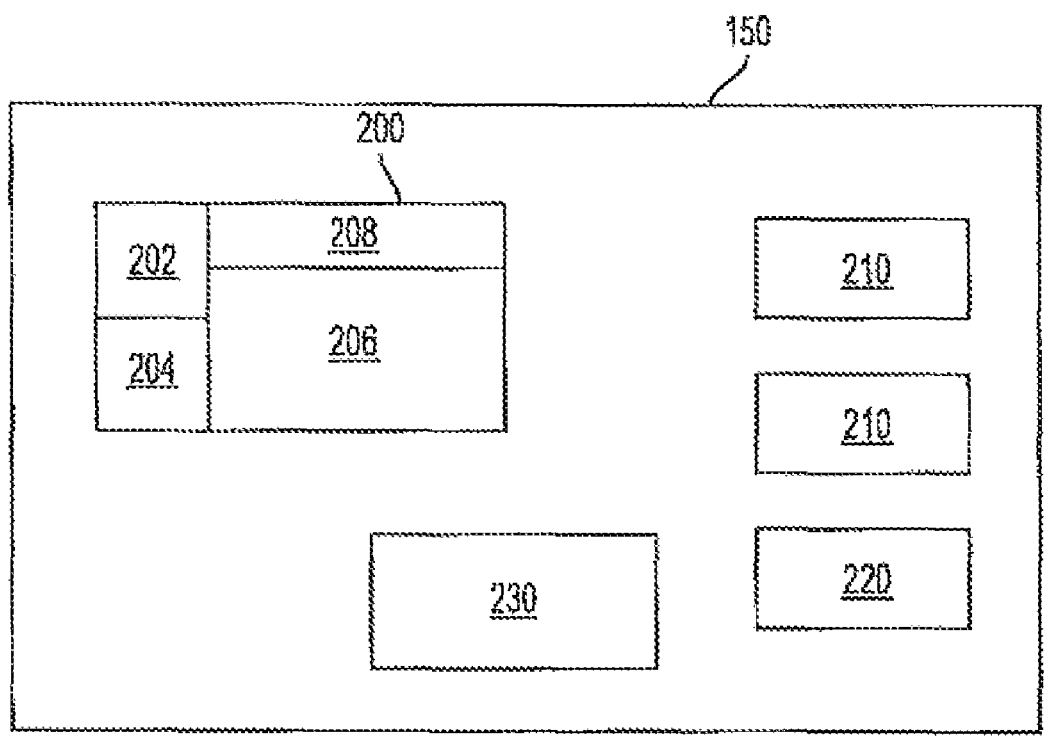
FIG. 2 is an example of the inventory control system of FIG. 1, which can include a general computer, which can be used to evaluate the various threshold policies according to present teachings.

The policies discussed below can be used by inventory control system 150 to minimize the average operating cost rate for inventory system 100 when demand for at least one item 110, 120, 130, ..., N is random. As shown in FIG. 2, inventory control system 150 can include a general computer 200 or computers (not shown) capable of executing a set of instructions and including e.g., processor 202, memory 204, other peripheral components 206, and input/output components 208. Inventory control system 150 can also include additional memory 210, additional input/output components, and other peripheral components 230 (e.g., receiver, transmitter, display, keyboard, storage devices, etc.) as are well known by those of skill in the art.

The following teachings include various definitions, assumptions, and equations.

The SJRP can have n items indexed by i=1, ..., n. Each item's inventory position $x_i$ is a real number and can often be restricted by a subset such as the integers. These may be compiled to form the inventory position n-vector x. An inventory position is defined as a physical inventory on hand plus inventory on order minus backlog. The major order setup cost is defined as a number k>0, with the interpretation that at any time, an inventory policy can set the inventory position of any set of items to a strictly higher value for a cost k. It is assumed for the following discussion that any minor order setup costs (e.g., fixed costs associated with ordering a specific item in addition to the cost of ordering a set of items) are negligible. The item cost rate $c_i(x_i)$ for item i is non-negative, convex, and coercive. The term coercive refers herein to a cost that increases to infinity as the inventory position tends to plus or minus infinity, so that $c_i(x_i) \to \infty$ as $|x_i| \to \infty$, thus coercing any reasonable policy to not make very large orders, nor to let backlog accumulate to very large values. At any time a policy must pay an amount $$\sum_{i=1}^{n} c_i(x_i)$$

per unit time when the item inventory positions are $x_i$.

The demand probability density (or distribution) function, Pr(t,d), at time t and for a non-negative n-vector d has the following interpretation. In time[t,t+dt], a demand vector d is drawn with probability Pr(t,d)dt and the inventory position of item i immediately jumps to $x_i$-$d_i$. Demand as used herein is assumed to be a compound Poisson process with rate $\lambda$>0 and a jump-size distribution G(d). This is a continuous-time stochastic process {Y(t):t≧0} given by $$Y(t) = \sum_{i=1}^{N(t)} d,$$

where {N(t):t≧0} is a Poisson process with rate $\lambda$ and {$d_i$: i≧1} are independent identically distributed random variables with distribution G(d) which are also independent of {N(t):t≧0}.

One way of describing the SJRP is a problem of minimizing the average operating cost rate of a policy $\pi$, $$\overline{v}[\pi] = \lim_{T \to \infty} \frac{1}{T} E\left[n_{order} T(k) + \int_0^T dt \sum_{i=1}^{n} [c_i(x_i(t)) | \pi]\right] \quad (1)$$

with respect to that policy, where $x_i(t)$ is the inventory position of item i at time t, $n_{order}(T)$ is the number of orders made by the policy up to time T and the expectation is over all sample paths of $x_i(t)$ given by the policy and demand probability density function on time interval t∈[0,T]. The initial state can be selected to be $x_i(0)$=0.

A cycle of a policy for the SJRP is the period between two orders. The item holding cost rate and penalty rate $h_i(x_i)$, $p_i(x_i)$ are a decomposition of the item cost rate, which satisfies $h_i(x_i)$+$p_i(x_i)$=$c_i(x_i)$. Both rates are convex functions of the item inventory position and $h_i$ must be increasing in $x_i$ while $p_i$ must be decreasing in $x_i$. The prevailing holding cost rate, prevailing penalty rate, and prevailing cost rate are sums over the corresponding item cost rates, defined by $$h(x) = \sum_{i=1}^{n} h(x_i), \; p(x) = \sum_{i=1}^{n} p_i(x_i), \; c(x) = \sum_{i=1}^{n} c_i(x_i), \text{ respectively.}$$

Frequently the holding and penalty costs are described in terms of a lead-time distribution and fixed versus proportional penalties. This description can be important for obtaining the costs rates, but only results in convex functions like $c_i(x_i)$, which are not necessary for this discussion. Herein, holding costs are costs that are non-decreasing with the inventory position and penalty costs are non-increasing with the inventory position. The holding costs and the penalty costs may have diverse components in any specific application. For example, holding costs might correspond to opportunity costs of having capital tied up in inventory as opposed to having the capital on hand to make acquisitions or other business actions. Holding costs can also include costs of renting or owning space to store items. Finally, holding costs can also correspond to the costs of security and safety associated with having a larger number of items, for example, if those items are at risk of theft, or are associated with dangers (for example, explosives, poisonous chemicals, radioactive substances, etc.). Penalty costs might include fixed costs each time an item cannot immediately be delivered to satisfy a demand, for example, when a sale is lost due to stock being out in a shop, when an engineer must make an extra visit to a customer site since they do not immediately have the right parts to repair or maintain a device, when airline customers must be compensated since an aircraft cannot be repaired or maintained due to lack of parts, etc. There can also be proportional penalty costs, which increase with time until demand can be satisfied. Proportional penalty costs arise, for example, as opportunity costs to a customer who cannot use a device until it is repaired, as reduction in customer satisfaction leading to reduced future customer equity, as contractual penalties for delay or downtime, as suffering induced if food is not supplied, etc.

It is a basic result of renewal theory that the average value of some function of the state of a stationary Markov chain whose recurrent set is connected is the expected value of the function along any path from a recurrent state x which then returns to that state. In other words, the average operating cost rate of a policy for a compound Poisson SJRP which always returns to some state S on ordering is the expected cost incurred in a cycle divided by the expected time for that cycle.

To characterize an optimal ordering policy the following definitions can be used. A policy is stationary if the distribution of actions that it takes in state x of a Markov decision problem (MDP) only depend on state x. A tie is a state where the value function of a policy can be achieved by more than one possible next action. It is well-known that any stationary continuous-time MDP with exponential state durations (e.g., a MDP driven by a compound Poisson process) can be discretized and uniformized such that it corresponds to a discrete-time MDP. A stopping time with respect to a sequence of random variables {$X_1, X_2, \ldots$} is a random variable $\tau$ with the properties: (i) for each t, the occurrence or non-occurrence of the event $\tau$=1 depends only on the values of {$X_1, X_2, \ldots, X_t$} and (ii) Pr($\tau$<∞)=1.

A stopping rule is a policy for a two-action MDP (in other words, an MDP where there are two actions, stopping and not stopping, corresponding here to ordering or not ordering). If a stopping rule is deterministic (i.e., it specifies only one action for a given state), the rule can be defined in terms of a stopping set a of states in which the stopping rules says stop, and a continuation set $\overline{\sigma}$ of states, which is the complement of set a where the stopping rule says to not stop. A stopping rule is monotone for an MDP if at any state x where the rule calls for stopping, the rule will also call for stopping at any state that is reachable from x by not stopping.

A penalty rate threshold policy ($\Omega_p$, S) is defined as making an order to order-up-to point S when the prevailing penalty rate would otherwise equal or exceed $\Omega_p$. A cost rate threshold policy ($\Omega_c$, S) is defined as making an order to S when the prevailing cost rate would otherwise equal or exceed $\Omega_c$. A martingale switch policy ($\Omega_{c1}, \Omega_{c2}$,S) is defined as making an order to S when the cost rate $c(x_t)$ in state $x_t$ satisfies:

$$c(x_t) \geq \begin{cases} \Omega_{c1} & \text{if } E[c(x_{t+1}) | x_t] < c(x_t) \\ \Omega_{c2} & \text{if } E[c(x_{t+1}) | x_t] \geq c(x_t) \end{cases} \quad (2)$$

In view of the policy definitions, the continuation sets $\overline{\sigma}_c$, $\overline{\sigma}_p$ of an appropriate cost rate threshold policy and an appropriate penalty rate threshold policy satisfy the property $\bar{\sigma}_c \subset \bar{\sigma}_* \subset \bar{\sigma}_p$ where $\bar{\sigma}_*$ is the continuation set for an optimal policy $\pi_*$, for order-up-to point S, which is stationary, and in the event of ties prefers ordering to continuing. A policy is an $\alpha$-approximation if the policy's cost is never more than a factor of $\alpha$ times the cost of an optimal policy. Additionally, for any order-up-to level S and compound Poisson demand, it is possible to determine a penalty rate threshold policy $(\Omega_p,S)$ that is a 3-approximation of an optimal policy using S.

Figure 3:
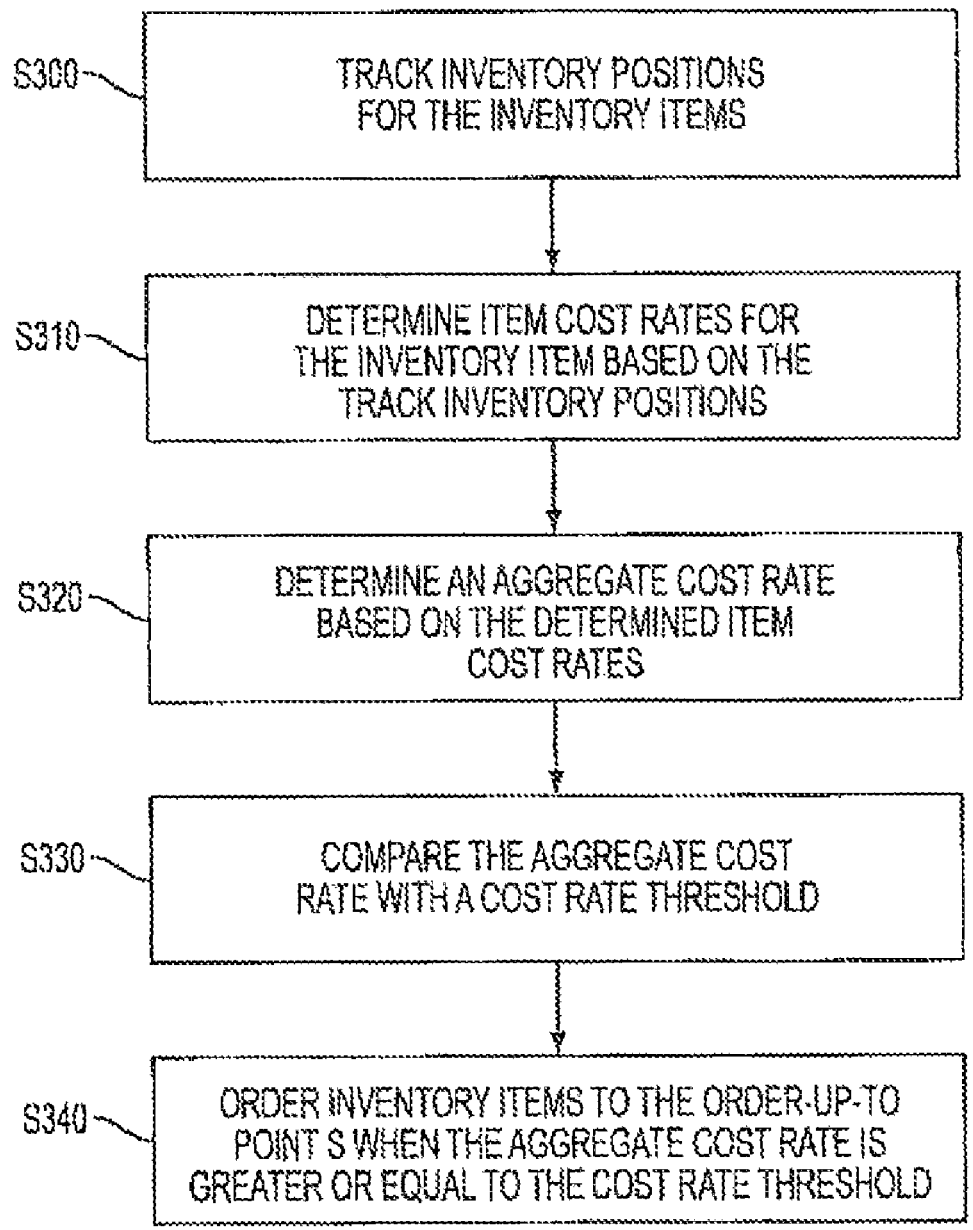
FIG. 3 is a flow chart showing steps to control the inventory system of FIG. 1 as can be performed by the inventory control system of FIG. 2.

FIG. 3 is a flow chart showing steps to control the inventory system of FIG. 1 as can be performed by the inventory control system of FIG. 2. In step S300 inventory positions are tracked for inventory items. In step S310 item cost rates for the inventory items are determined based on the tracked inventory positions. Next an aggregate cost rate based on the determined item cost rates is determined in step S320. The aggregate cost rate is compared with a cost rate threshold in step S330 and finally an order is placed for inventory items to an order-up-to point S if the compared aggregate cost rate is greater than or equal to the cost rate threshold. The cost rate threshold can be a penalty rate threshold where, if the prevailing penalty cost rate for the inventory items is greater or equal to the penalty rate threshold then inventory items are ordered to order-up-to point S. Alternatively, the cost rate threshold can include two cost rate thresholds. The first cost rate threshold applies when the aggregate cost rate is decreasing and the second cost rate threshold applies when the aggregate cost rate is increasing. An order is placed when the aggregate cost rate is greater than the first or second threshold.

Figure 4:
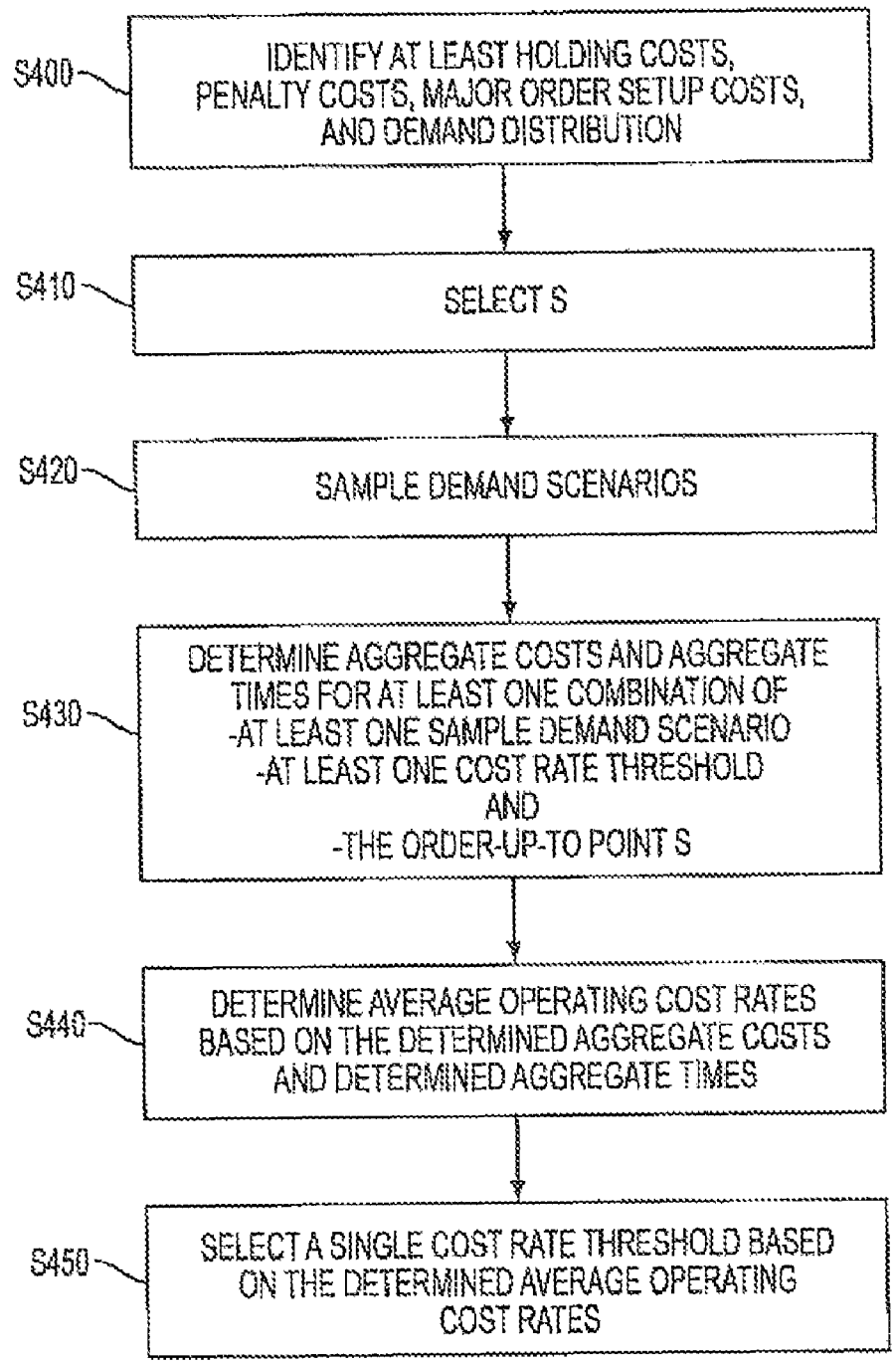
FIG. 4 is a flow chart showing steps to evaluate a cost rate threshold policy ($\Omega_c S$), according to present teachings.

Shown in FIG. 4 is an example embodiment of a method for determining a cost rate threshold policy $(\Omega_c, S)$ for an inventory system (e.g., 100 in FIG. 1). Step S400 initially identifies holding costs, penalty costs, major order setup costs, and a demand distribution (i.e. operating cost parameters) for an inventory system 100. In step S410 an order-up-to point S is selected based on the initially identified costs by various well known SJRP policies (for example, a QS policy, a can-order policy, a periodic review policy, a Q(s,S) policy, etc).

In the next step, demand scenarios are sampled according to step S420. A demand scenario $\xi$ is represented as a sequence of demand vectors d(t) where component $d_i(t)$ denotes how many of item i were demanded at time t. For each demand scenario $\xi$, the inventory positions $x_i(t)$, the prevailing cost rate $c_\xi(t)$ and the aggregate cost rate $C_\xi(t)$ are tracked to stage t by the following recursion:

$$x_i(0) = S_i \text{ for } i = 1, \ldots, n, \quad (3)$$

$$x_i(t+1) = x_i(t) - d_i(t+1), \text{ for } i: d_i(t+1) \neq 0, \quad (4)$$

$$c_\xi(0) = \sum_{i=1}^n c_i(x_i(0)), \quad (5)$$

$$c_\xi(t+1) = c_\xi(t) + \sum_{i: d_i(t+1) \neq 0} (c_i(x_i(t+1)) - c_i(x_i(t))), \quad (6)$$

$$C_\xi(1) = c_\xi(1), C_\xi(t) = c_\xi(t-1) + C_\xi(t-1), t > 1. \quad (7)$$

As will be obvious to one of ordinary skill in the art, equation (6) (which recursively updates the aggregate cost rate by summing only over items which have been demanded), is equivalent to summing over all items, however it is typically far more efficient than summing over all items when there are many items and demand is sparse. Finding the first time at which the prevailing cost rate equals or exceeds any given threshold for a given scenario is straightforward. Coupling the above with a search over thresholds and determination of the average operating cost rate, one can approximate the optimal choice of the threshold. The range of thresholds to search can obviously be restricted to the set of all values of the prevailing cost rate that are observed in any of the scenarios.

Again, as will be obvious to one of ordinary skill in the art, repeatedly conducting a search over all times to determine the first time at which the prevailing cost rate equals or exceeds a given threshold can be avoided, thereby making the process significantly more efficient. As shown in step S430, aggregate costs and aggregate times can be determined for at least one combination of at least one sampled demand scenario, at least one cost rate threshold, and the order-up-to point S. For example, for each scenario $\xi$ one can predetermine the sequence of cumulative (i.e. historical) maxima of the prevailing cost rate $\omega_\xi(k)$ and the corresponding time steps $t_\xi(k)$ indexed by k at which the prevailing cost rate reaches $\omega_\xi(k)$ for the first time. One can also determine the aggregate cost $C_\xi(k)$ up to time $t_\xi(k)$ for the given scenario. The corresponding history sequence $H_\xi := (\omega_\xi(k), t_\xi(k), C_\xi(k))_{k=1, 2, \ldots}$ corresponds to all possible distinct cost rate thresholds at which the cost for a scenario might be usefully evaluated.

In step S440 average operating cost rates $R(\Omega_c)$ are determined as a function of cost rate thresholds $\Omega_c$, by walking through sequences $H_\xi$ across all demand scenarios in order of increasing $\omega$):

$$R(\Omega_c) = \frac{n_\xi k + \sum_\xi C_\xi(\Omega_c)}{\sum_\xi t_\xi(\Omega_c)}. \quad (8)$$

Whereas Equations (3-7) had aggregate costs as a function of time, Equation (8) treats the aggregate costs and times as a function of prevailing cost rate threshold $\omega$, by defining $C_\xi(\omega):=C_\xi(k)$ and $t_\xi(\omega)):=t_\xi(k)$ where k is the first index in the history sequence at which the next prevailing cost rate $\omega_\xi(k+1)$ equals or exceeds that threshold, i.e. $\min\{k: \omega_\xi(k+1) \geq \omega\}$.

The run time for this process of course varies with the scale of the problem, however it remains practical even for large numbers of items, scenarios and dense searches over cost rate thresholds. In final step S450 a single cost rate threshold $\Omega_c$ is selected for the inventory system based on the determined average operating cost rates. The selected cost rate threshold $\Omega_c$ can minimize the average operating cost rates across the demand scenarios for the inventory system (e.g., 100). As is obvious to one reasonably skilled in the art, rather than minimizing the average operating cost rate for the inventory system, one can instead select a cost rate threshold $\Omega_c$ that achieves a reasonably low value for the aggregate operating cost rate based on, for example, system requirements, client requirements, type of inventory, etc.

Figure 5:
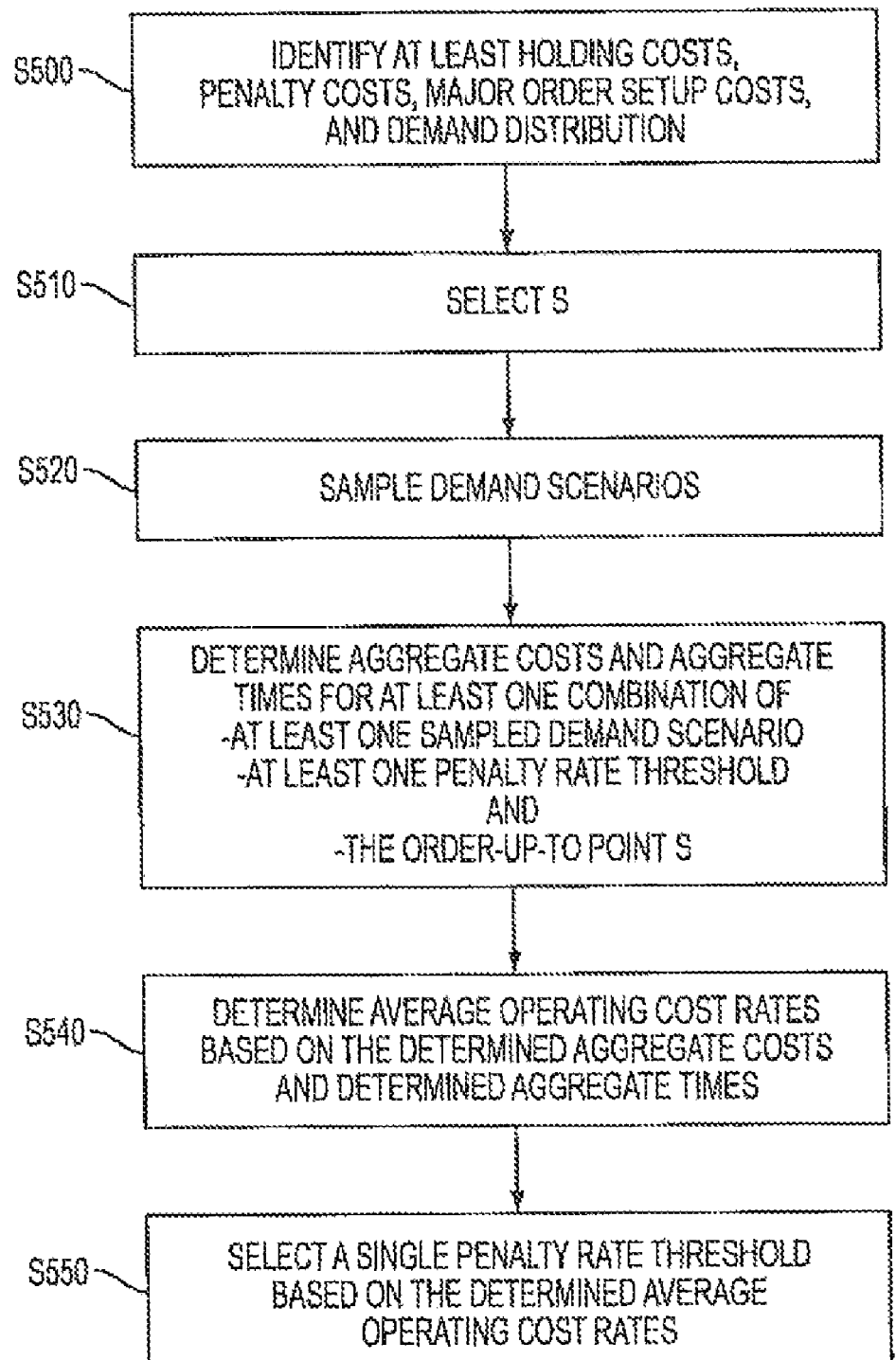
FIG. 5 is a flow chart showing steps to evaluate a penalty rate threshold policy ($\Omega_p S$), according to present teachings.

The following is an example embodiment of a method for determining a $(\Omega_p,S)$ policy as shown in FIG. 5. This proceeds analogously to the method for determining a cost rate threshold policy $(\Omega_c,S)$ discussed above, except that rather than thresholding the prevailing cost rate, one thresholds the prevailing penalty rate. Step S500 initially identifies holding costs, penalty costs, major order setup costs, and a demand distribution for an inventory system (e.g., inventory system 100). In step S510 an order-up-to point S is selected based on initially identified costs by various well known SJRP policies (for example, a QS policy, a can-order policy, a periodic review policy, or a Q(s,S) policy).

In the next step, demand scenarios are sampled according to step S520. For each demand scenario $\xi$ the prevailing cost rate $c_\xi$ (t), prevailing penalty rate $p_\xi$ (t) and aggregate cost $C_\xi$ (t) are tracked to stage t by the following recursion:

$$x_i(0) = S_i \text{ for } i = 1, \ldots, n, \qquad (9)$$

$$x_i(t+1) = x_i(t) - d_i(t+1), \text{ for } i: d_i(t+1) \neq 0, \qquad (10)$$

$$c_\xi(0) = \sum_{i=1}^n c_i(x_i(0)), \; p_\xi(0) = \sum_{i=1}^n p_i(x_i(0)), \qquad (11)$$

$$c_\xi(t+1) = c_\xi(t) + \sum_{i:\, d_i(t+1)\neq 0} (c_i(x_i(t+1)) - c_i(x_i(t))), \qquad (12)$$

$$p_\xi(t+1) = p_\xi(t) + \sum_{i:\, d_i(t+1)\neq 0} (p_i(x_i(t+1)) - p_i(x_i(t)))$$

$$C_\xi(1) = c_\xi(0), \; C_\xi(t) = c_\xi(t-1) + C_\xi(t-1), \; t > 1. \qquad (13)$$

Coupling the above with a search over penalty rate thresholds and determination of the average operating cost rate, one can approximate the optimal choice of the threshold.

Again, as will be obvious to one of ordinary skill in the art, repeatedly conducting a brute force search to determine the first time at which the prevailing penalty rate equals or exceeds a given threshold can be avoided, thereby making the process significantly more efficient. As shown in step S530, aggregate costs and aggregate times can be determined for at least one combination of at least one sampled demand scenario, at least one penalty rate threshold, and the order-up-to point S. For example, for each scenario $\xi$ one can predetermine the sequence of cumulative (i.e. historical) maxima of the prevailing penalty rate $\omega_\xi$ (k) and the corresponding time steps $t_\xi$ (k) indexed by k at which the prevailing penalty rate reaches $\omega_\xi$ (k) for the first time. One can also determine the aggregate cost $C_\xi$ (k) up to time $t_\xi$ (k) for the given scenario $\xi$. The corresponding history sequence $H_\xi := (\omega_\xi$ (k), $t_\xi$ (k), $C_\xi$ (k))$_{k=1, 2, \ldots}$ corresponds to all possible distinct cost rate thresholds at which the cost for a scenario might be usefully evaluated.

In step S540 average operating cost rates are determined $R(\Omega_p)$ as a function of penalty rate thresholds $\Omega_p$, by walking through sequences $H_\xi$ across all demand scenarios in order of increasing $\omega$:

$$R(\Omega_p) = \frac{n_\xi k + \sum_\xi C_\xi(\Omega_p)}{\sum_\xi t_\xi(\Omega_p)}. \qquad (14)$$

Equation (14) uses the natural definition for any prevailing penalty rate threshold $\omega$, that $C_\xi (\omega):=C_\xi$ (k) and $t_\xi (\omega):=t_\xi$ (k) where k is the first index in the history sequence at which the next prevailing cost rate $\omega_\xi$ (k+1) equals or exceeds that threshold, i.e. min{k: $\omega_\xi$ (k+1)$\geq\omega$}.

The run time for this process of course varies with the scale of the problem, however it remains practical even for large numbers of items, scenarios and dense searches over cost rate thresholds. In final step S550 a single penalty rate threshold $\Omega_p$ that minimizes the average operating cost rates across the demand scenarios is selected as the threshold for the inventory system (e.g., 100). Obviously, one might instead select a penalty rate threshold $\Omega_p$ that achieves a reasonably low value for the aggregate operating cost rate as discussed above.

As presently taught, two inventory control policies to be used for the SJRP, have been determined. First, a cost rate threshold policy ($\Omega_c$,S) uses a cost rate threshold $\Omega_c$ and an order-up-to point S and second, a penalty rate threshold policy ($\Omega_p$,S) uses a penalty rate threshold $\Omega_p$ and an order-up-to point S. Similarly one may determine a martingale switch policy ($\Omega_{c1}$,$\Omega_{c2}$,S) using a decreasing cost rate threshold $\Omega_{c1}$, an increasing cost rate threshold $\Omega_{c2}$, and an order-up-to point S as shown by equation (2).

The determination of the martingale switch policy can proceed using similar scenarios as for the other two types of policies. However, a two-dimensional search over parameters is conducted, the details of this "brute-force" approach being obvious to one of ordinary skill based on the previous discussions. However, the corresponding two-dimensional search can render the determination of such policies less efficient.

Cost rate threshold policies are a subset of martingale switch policies. Thus, it is always possible to find a martingale switch policy that is at least as good as the best cost rate threshold policy. In some practical circumstances the need for computational speed and simplicity can outweigh the need to reduce costs by another percentage point. In such circumstances it would be preferable to determine a cost rate threshold policy and a penalty rate threshold policy and use that which achieves the best performance as measured by average overall cost rate on the given problem or dataset. In other situations, the need to reduce costs by another percentage point outweighs the desire for computational speed and simplicity. In these circumstances, one could prefer to determine a martingale switch policy and a penalty rate threshold policy and pick the policy, which achieves the best performance, as measured in terms of average overall cost rate. In both cases, the costs will be no more than a factor of 3 more than those of an optimal policy (e.g., typically the results are within 1% of those of an optimal policy) and these policies (cost, penalty, and martingale) have been found to have structures close to an optimal policy for the SJRP. In additional embodiments, if costs are discounted, a practice well-known to those skilled in the art of Markov decision problems, the cost rates can be directly evaluated by including the discount factor in the determination of the cumulative cost and time to reach a threshold in equations (6, 8, 12, 14). For instance, for a discount factor (or more precisely, average discount factor per aggregate demand) $\gamma$ one may replace the average operating cost rate by a discounted average operating cost rate $$R(\Omega_p; \gamma) = \frac{n_\xi k + \sum_\xi C_\xi(\Omega_p; \gamma)}{\sum_\xi \sum_{s=0}^{t_\xi(\Omega_p)-1} \gamma^s}$$

where $C_\xi(1) = \gamma c_\xi(0), \; C_\xi(t) = \gamma^{t-1} c_\xi(t-1) + C_\xi(t-1), \; t > 1.$ In yet additional embodiments, rather than exploiting scenarios to estimate and thereby optimize cost rates, it is possible, but relatively inefficient to use convolutions. At any given time from the start of a cycle, the cost rate is a sum of cost rates over items. The probability density of a sum is the convolution of the probability densities of the individual terms of the sum. The probability density function of the cost rate for an individual item is readily obtained from the probability density function for the inventory position of that individual item. The probability density function for the inventory position of that individual item, given that no orders have been made in the current cycle, is in turn obvious to determine from the known demand distribution. For example, convolutions might be determined using fast Fourier transforms (FFTs) after a fine discretization of the space of possible cost rates, or by maintaining sorted lists of possible values for the sums involved. Yet other methods for determining optimal prevailing cost or penalty rate threshold parameters will be obvious to those skilled in the art, for example, using stochastic approximation methods, like the Kiefer-Wolfowitz procedure, or exploiting so-called branching scenarios, which are well-known in the art of stochastic programming. Finally, it is obvious that various blends of the prevailing holding cost and penalty cost, such as linear weighted combinations of them, can be exploited in place of the thresholds directly on the prevailing cost rate or penalty rate, without departing from the spirit of the invention.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Certain embodiments may be performed as a computer program. The computer program may exist in a variety of forms both active and inactive. For example, the computer program can exist as software program(s) comprised of program instructions in source code, object code, executable code, or other formats; firmware program(s); or hardware description language (HDL) files. Any of the above can be embodied on a computer readable medium, which include storage devices. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling an inventory including a plurality of items, comprising:
    tracking an inventory position of each of the plurality of items at a logistics network;
    determining an item cost rate based on the tracked inventory position;
    determining an aggregate cost rate based on the determined item cost rates;
    comparing the aggregate cost rate with a cost rate threshold; and
    ordering the plurality of items to an order-up-to point if the compared aggregate cost rate is greater than or equal to the cost rate threshold;
    wherein the cost rate threshold depends on an expected rate of change of the aggregate cost rate, and wherein the cost rate threshold is a first value when the expected rate of change of the aggregate cost rate decreases and the cost rate threshold is a second value when the expected rate of change of the aggregate cost rate increases.

2. The method of claim 1, wherein the method is at most about a 3-approximation of an optimal inventory policy.

3. The method of claim 1, wherein the determined item cost rate is a penalty cost rate.

* * * * *